June 4, 1957 T. M. DEAKIN 2,794,302

BEVEL GEAR GENERATING MACHINES

Filed June 26, 1952 16 Sheets-Sheet 1

Inventor
Thomas Meyrick Deakin
By Karl W. Flocks
Attorney

June 4, 1957 T. M. DEAKIN 2,794,302

BEVEL GEAR GENERATING MACHINES

Filed June 26, 1952 16 Sheets-Sheet 2

Inventor
Thomas Meyrick Deakin

By Karl W. Flocks
Attorney

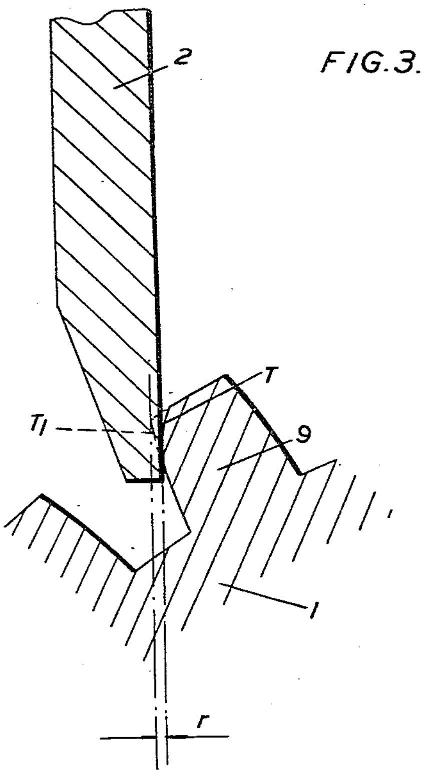
FIG. 3.
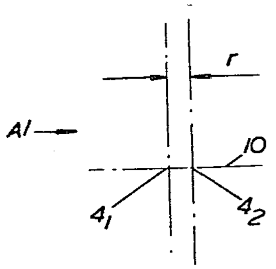
Inventor
Thomas Meyrick Deakin
By Karl W. Flocks
Attorney

BEVEL GEAR GENERATING MACHINES

Filed June 26, 1952 16 Sheets-Sheet 4

Inventor
Thomas Meyrick Deakin

By Karl W. Flocks
Attorney

June 4, 1957 T. M. DEAKIN 2,794,302

BEVEL GEAR GENERATING MACHINES

Filed June 26, 1952 16 Sheets-Sheet 5

Inventor
Thomas Meyrick Deakin
By Karl W. Flocks
Attorney

BEVEL GEAR GENERATING MACHINES

Thomas Meyrick Deakin
Inventor

By Karl W. Flocks
Attorney

Inventor
Thomas Meyrick Deakin
By Karl W. Flocks
Attorney

June 4, 1957 T. M. DEAKIN 2,794,302

BEVEL GEAR GENERATING MACHINES

Filed June 26, 1952 16 Sheets-Sheet 8

Thomas Meyrick Deakin, Inventor

By Karl W. Flocks Atty.

Thomas Meyrick Deakin, Inventor
By Karl W. Flocks, Atty.

Thomas Meyrick Deakin, Inventor
By Karl W. Flocks, Atty

June 4, 1957 T. M. DEAKIN 2,794,302

BEVEL GEAR GENERATING MACHINES

Filed June 26, 1952 16 Sheets-Sheet 11

Thomas Meyrick Deakin, Inventor

By Karl W. Flocks, Atty

Thomas Meyrick Deakin, Inventor
By Karl W. Flocks, Atty.

June 4, 1957 T. M. DEAKIN 2,794,302

BEVEL GEAR GENERATING MACHINES

Filed June 26, 1952 16 Sheets-Sheet 13

Thomas Meyrick Deakin, Inventor

By Karl W. Flocks Atty.

June 4, 1957 T. M. DEAKIN 2,794,302

BEVEL GEAR GENERATING MACHINES

Filed June 26, 1952 16 Sheets-Sheet 14

Thomas Meyrick Deakin, Inventor

By Karl W. Flocks Atty

Thomas Meyrick Deakin, Inventor
By Karl W. Flocks Atty.

June 4, 1957 T. M. DEAKIN 2,794,302

BEVEL GEAR GENERATING MACHINES

Filed June 26, 1952 16 Sheets-Sheet 16

Inventor
THOMAS MEYRICK DEAKIN
By. Karl W. Flocks
Attorney

United States Patent Office 2,794,302

Patented June 4, 1957

2,794,302

BEVEL GEAR GENERATING MACHINES

Thomas Meyrick Deakin, London, England

Application June 26, 1952, Serial No. 295,658

Claims priority, application Great Britain June 27, 1951

18 Claims. (Cl. 51—56)

This invention relates to bevel gear generating machines for forming or measuring the profiles of bevel gear teeth and is particularly concerned with machines which operate on the "generating roll" principle in which the work and the tool are given a relative motion equivalent to that produced either by the rolling of a cone representing the bevel gear on a plane (hereinafter called the generating plane) which contains a generator (represented by the tool) for the tooth profile to be formed, or by the meshing of the finished gear with a master gear or tooth represented by the tool, this latter motion being equivalent to the rolling, without slip, of the pitch surfaces of the two gears against each other. Machines which operate in this manner will be referred to in this specification as bevel gear generating machines of the kind described.

In machines of the kind described, the whole of the generating roll motion may be imparted to the work or to the tool, the other member then being fixed in the machine frame or given only such traversing motion as may be required to cause the tool to machine the full length of the tooth flank being generated. Alternatively, part of the generating roll motion may be imparted to the work and the other part to the tool. In any of these arrangements, an additional feed motion is required where it is necessary to remove metal from the tooth—i. e. where the tooth profile is not merely being measured or checked for slight deviations from the true profile—although in the latter cases also a feed motion may be employed to maintain contact between the gauge or truing tool, the extent of the feed motion required being then a measure of the inaccuracy of the profile.

Thus, control of the thickness of a tooth may be represented as a modification of the feed motion of the blank, increased feed leading to a reduction in tooth thickness and vice versa. Similarly, where tip or root relief are required on a tooth profile, or where a longitudinal curvature is to be imparted to the tooth, it will be clear that such modifications of the profile can be provided by suitably modifying the feed of the tooth into the tool over the appropriate portions of the tooth flank. Thus, for example, where tip relief is to be provided, the amount of feed of the gear blank as the tool reaches the tip of the tooth is increased so that a greater amount of material is machined away adjacent the tooth tip. Clearly, similar considerations where root relief is required. Similarly, where a longitudinal curvature is to be imparted the tooth, the rate of feed of the gear blank is increased as the tool approaches the ends of the tooth. Where the tool is a grinding wheel, however, the wheel must be displaced in the direction of feed so as to remain parallel to its original plane of action.

From the foregoing, therefore, it will be apparent that by superimposing upon the generating roll mechanism a component of motion which increases or decreases the angular or bodily lateral displacement of the axis of the gear blank, suitable modification of the tooth thickness or tooth flank profile may be effected.

It is important to note, however, that where the bevel gear blank being machined is a crown wheel of a so-called "octoid" type of bevel gear in which the pitch surface is adopted as the datum for generation of the tooth flank profile, the tooth flanks are flat, and the displacement of the axis of the gear blank in the generating roll motion is reduced to zero. It will not, therefore, be possible in these particular circumstances to provide tip or root relief by a modified feed motion. An octoid crown gear thus represents a dis-continuity in the relationship which otherwise obtains for any other form of bevel gear between the components of the generating roll viz. rotation of the gear blank about its axis and displacement of the axis. All other modifications of the tooth profile mentioned above may, however, be effected by control of the feed motion of an octoid crown gear.

It will further be understood that, if a feed motion of the nature envisaged above is increased in magnitude until it reaches the value of a tooth pitch, or an integral number of tooth pitches, the equivalent of an indexing operation is achieved. It is, therefore, envisaged that the present invention will extend to the provision of at least a limited indexing action which will reduce the number of normal indexing operations required in the machining of a given blank. Such normal operations customarily involve the temporary stoppage of the machining while the gear blank is reset in its holder to preset another tooth flank to the tool.

In a bevel gear generating machine according to the present invention, means is provided for increasing the magnitude of the normal component of work axis displacement in the generating roll motion in the sense for feeding the work towards the tool.

Where the machine operates on the principle of the machines described in the specification of my co-pending patent application Serial No. 267,986, filed January 24, 1952, or in Patent No. 2,758,513 which was granted to me on August 14, 1956, in which the generating plane or surface is represented by a disc or sector-shaped member, the arcuate periphery of which is connected in non-slip relation to a slide coupled to the work or tool holder, the increased component of the roll motion may be applied as a rotation of the said member.

Embodiments illustrative of the invention will now be described, by way of example only, with reference to the accompanying drawings in which:

Figs. 2 and 3 show successive stages in the machining of a gear blank illustrating respectively the reduction of tooth thickness and the formation of tip relief;

Figure 9A:
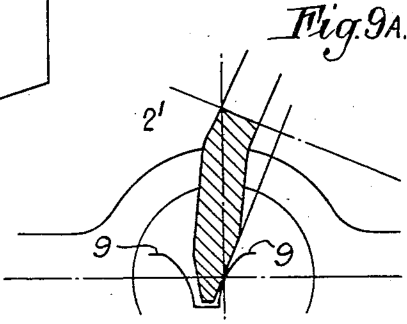
Fig. 9 is a part-sectional front elevation on the arrow IX of Fig. 8, parts being broken away for clarity of illustration.
Figure 9:
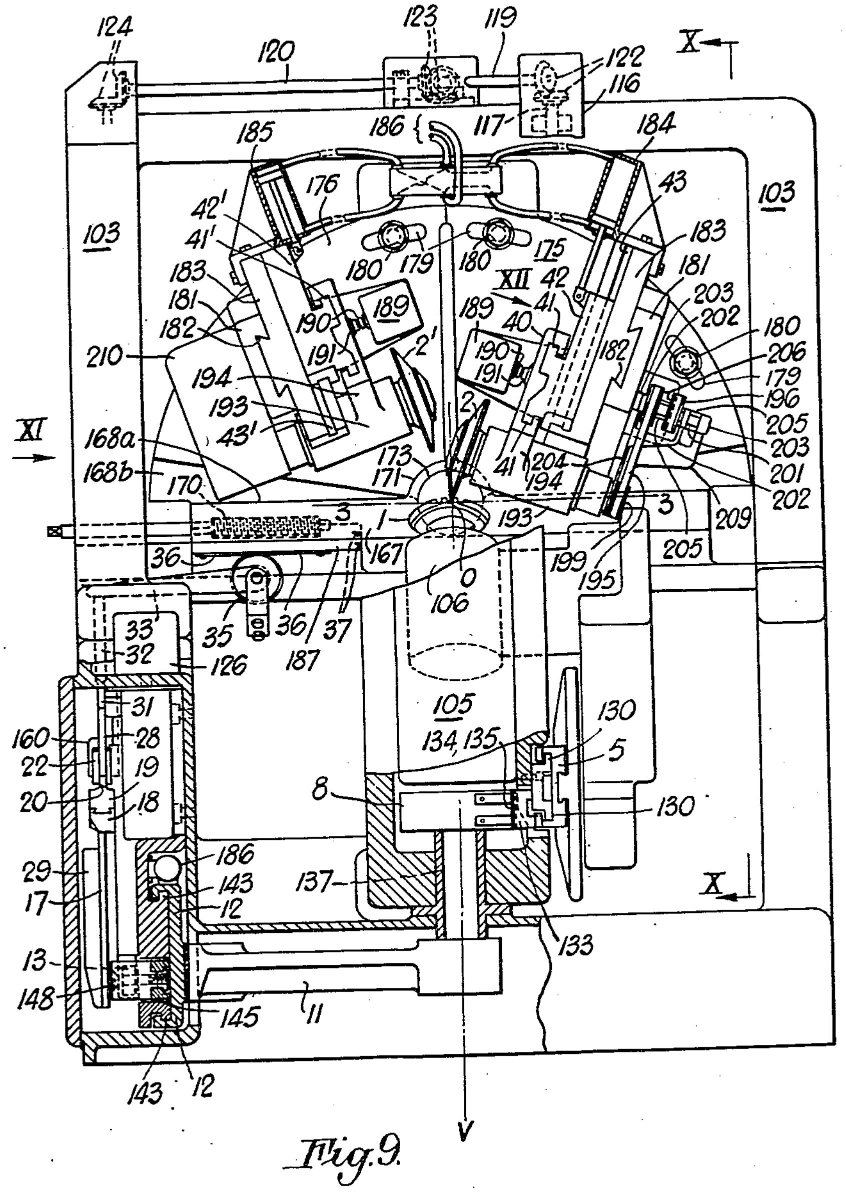
Figure 10:
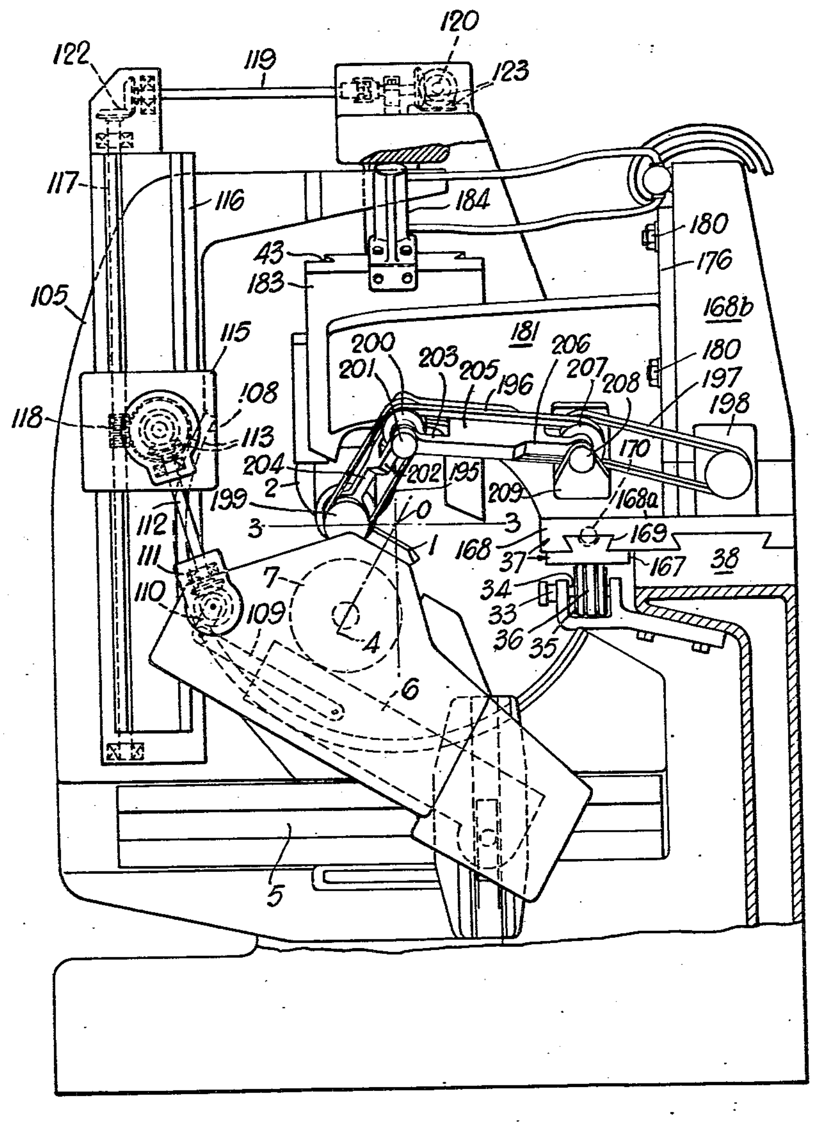
Figure 11:
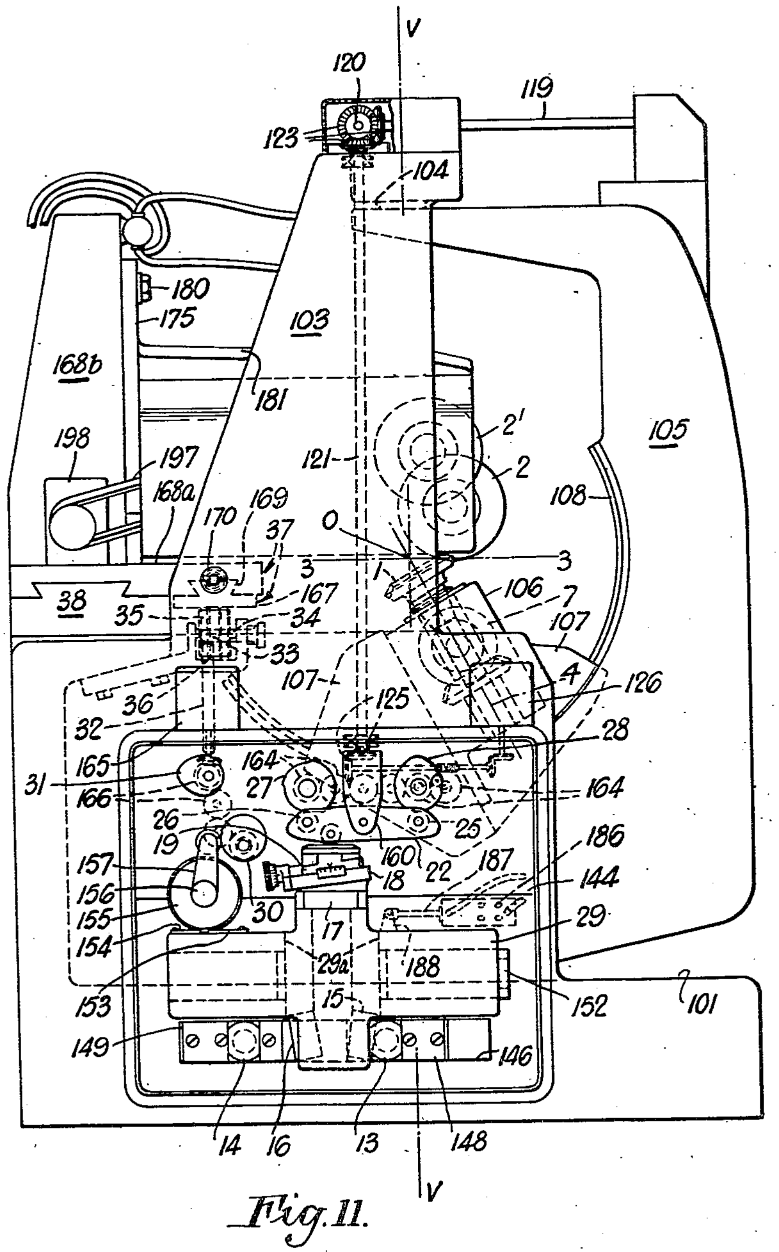
Figures 12, 13:
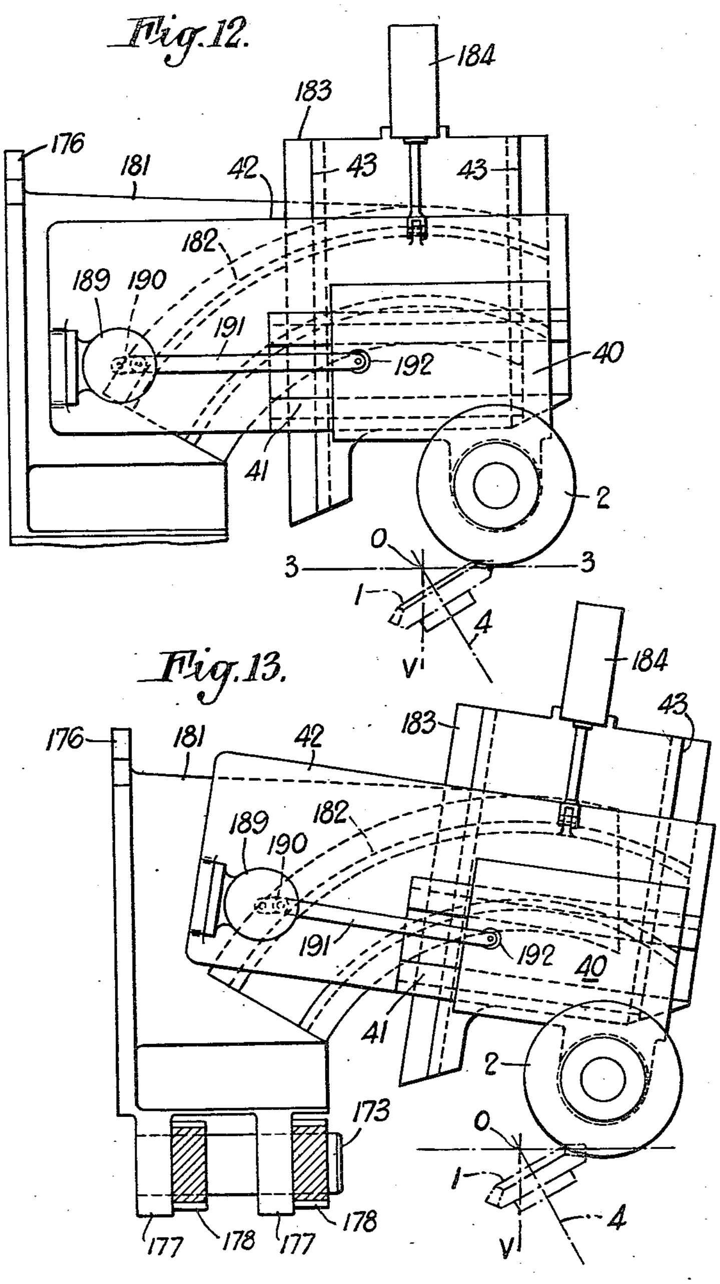
Figures 14, 14A:
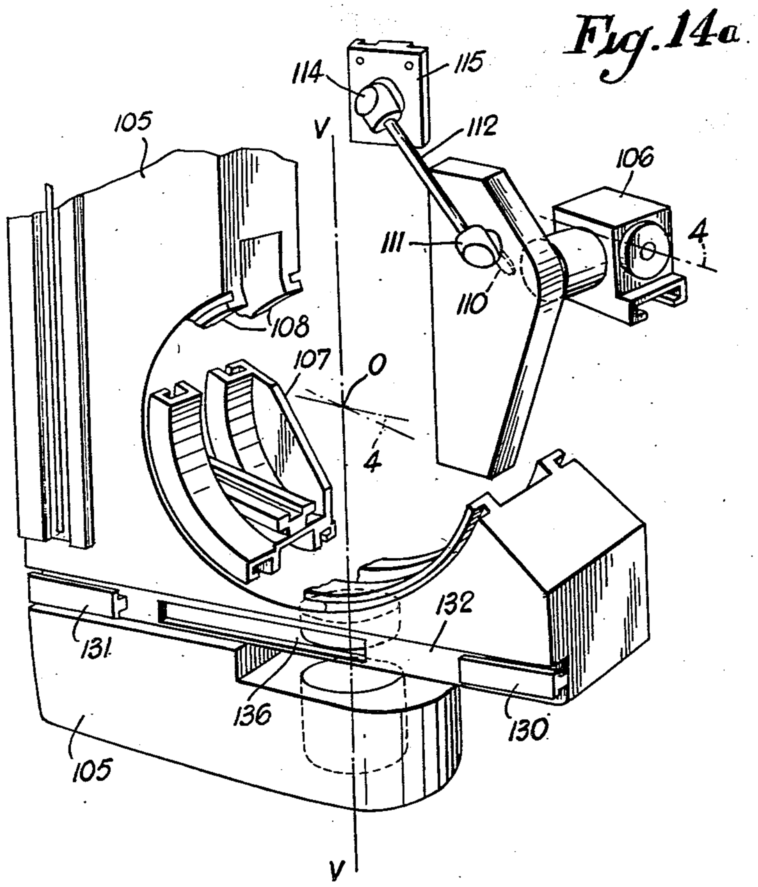

Fig. 9*a* is a fragmentary view, to a larger scale, of part of Fig. 9;

Fig. 10 is a section in the line X—X of Fig. 9;

Fig. 11 is a view on the arrow XI of Fig. 9;

Fig. 12 is a fragmentary view on the arrow XII of Fig. 9;

Fig. 13 is a view similar to Fig. 12 showing the tool slide set for machining the dedendum angle of a gear tooth;

Fig. 14 is a fragmentary perspective view of a part of the machine on which the work head carriage is mounted.

Figure 19:
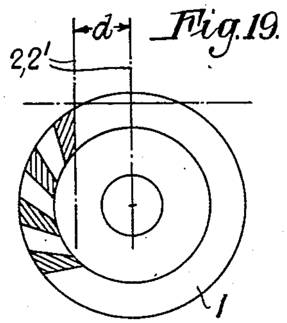
Figure 16:
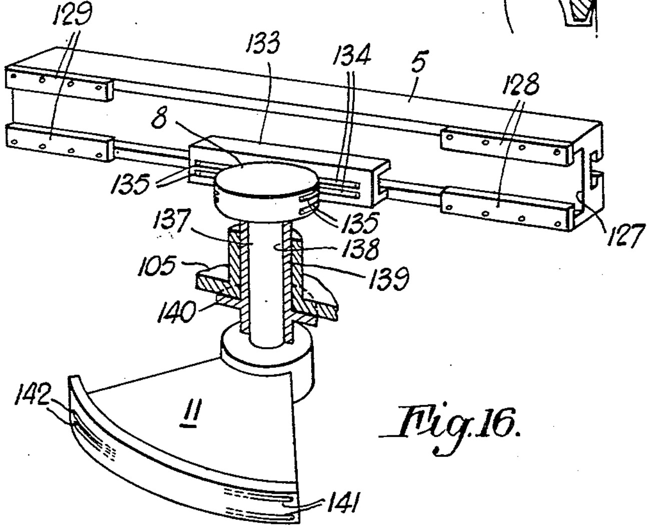
Figure 15:
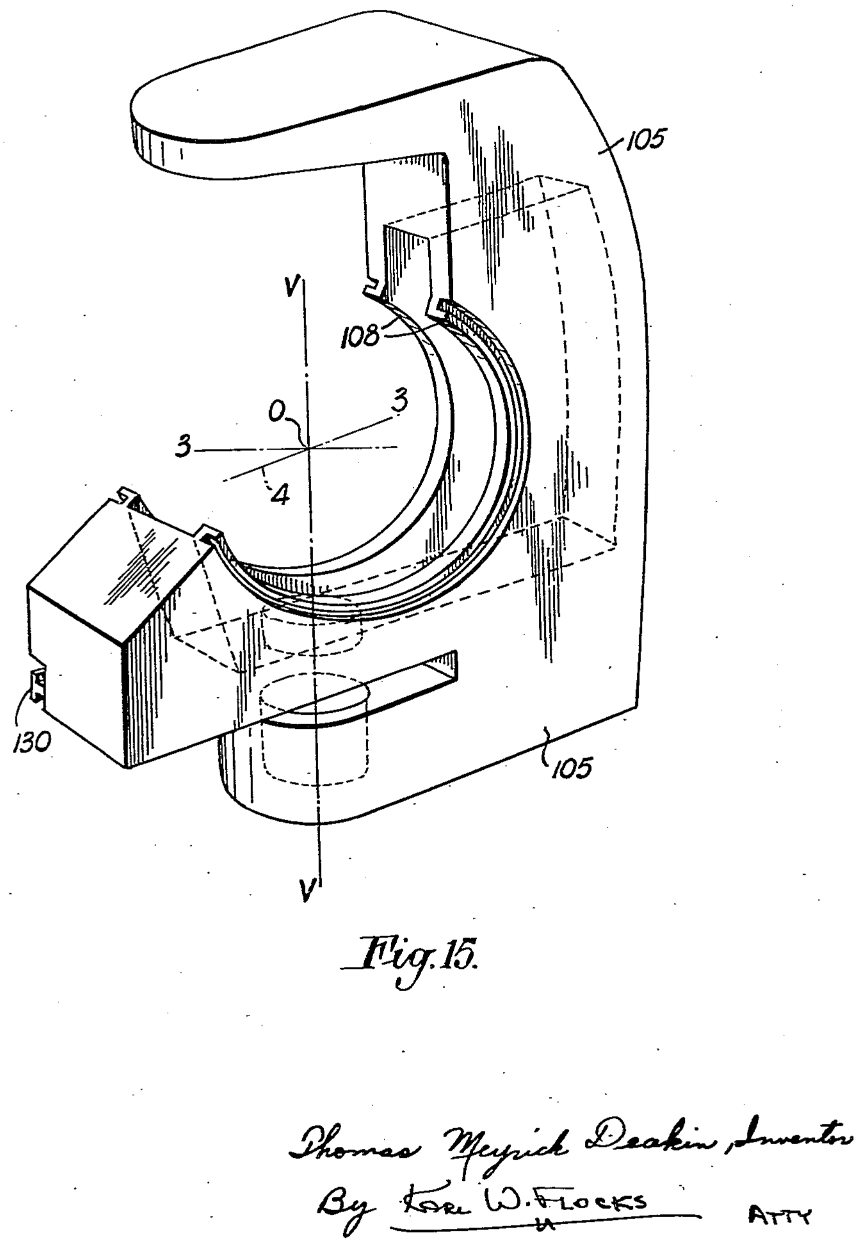
Figure 17:
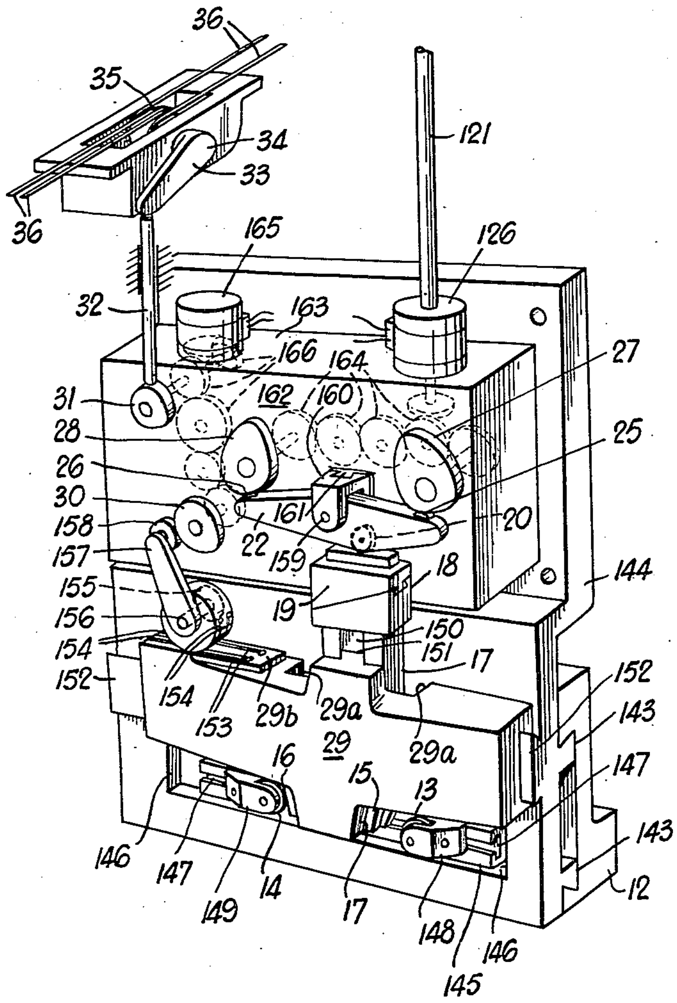
Figure 18:
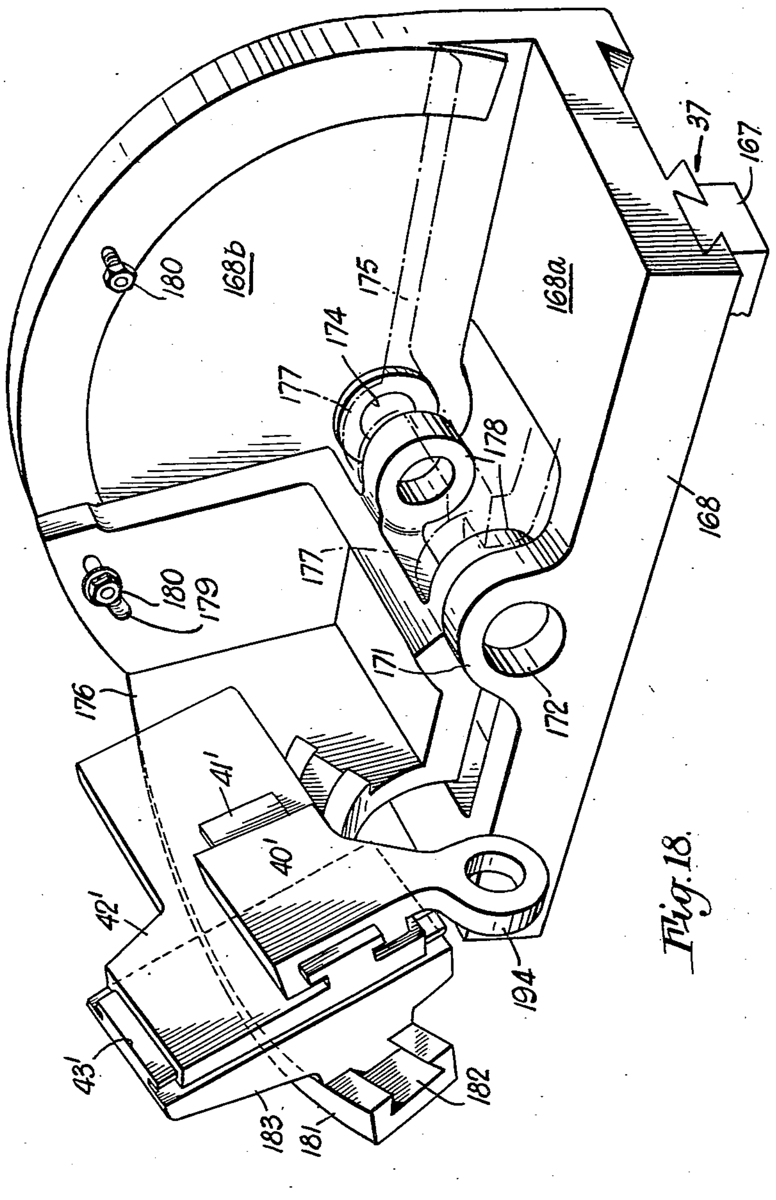

Fig. 14*a* is a perspective view of the work head and associated actuating mechanism shown in exploded relationship with the parts in Fig. 14;

Fig. 15 is a perspective view of the part shown in Fig. 14 but viewed from the opposite side;

Fig. 16 is a part-sectional perspective view of the base drum and associated mechanism;

Fig. 17 is a perspective view of the feed control and tool head control gear;

Fig. 18 is a perspective view of the tool head subassembly, the righthand tool head and both tools being omitted, and Fig. 19 is a schematic view showing how the teeth of a skew bevel gear are cut on the machine.

Throughout the drawings, like parts carry similar reference numerals.

Reference will first be made to the schematic arrangement shown in Figs. 1 to 7.

Figure 1:
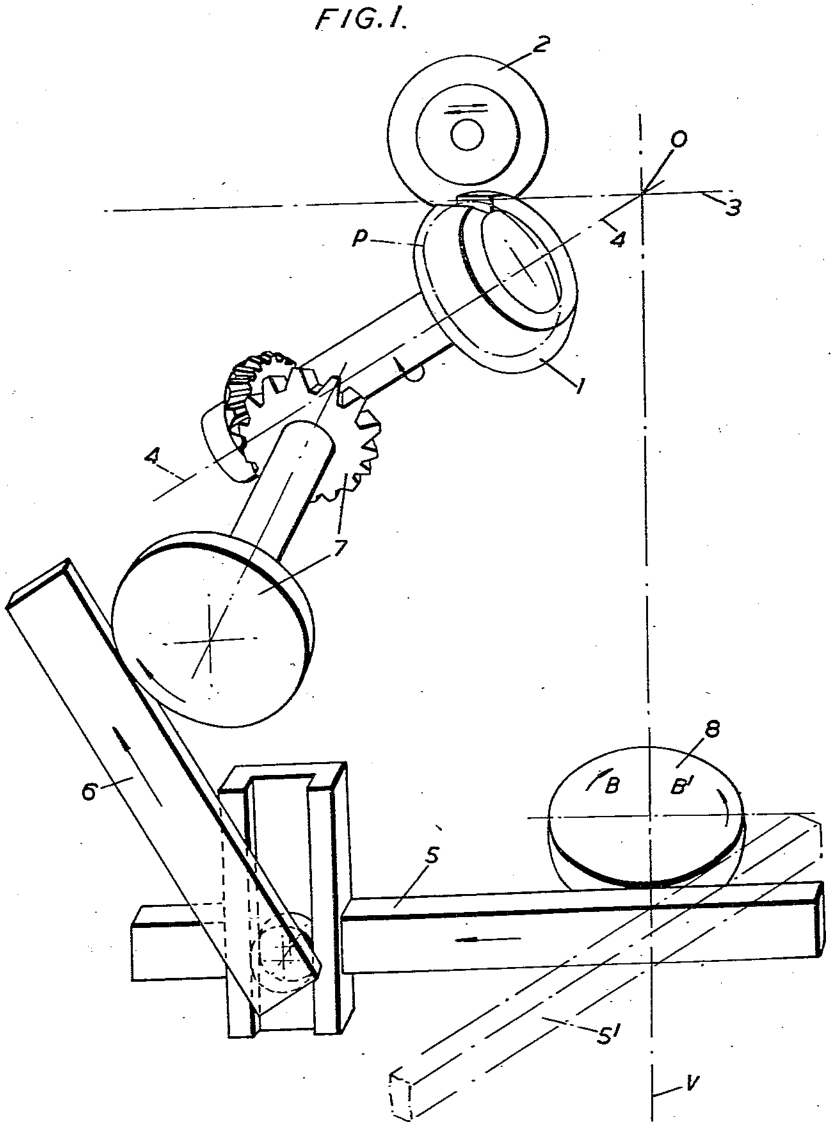
Fig. 1 is a schematic perspective sketch of a form of generating roll mechanism for a bevel gear generating machine of the kind described, and to which the improvements illustrated in the succeeding figures will be assumed to be applied.

In the mechanism illustrated schematically in Fig. 1, the gear blank 1 is rolled past the tool 2 (shown as a grinding wheel) with a motion equivalent to the rolling of its pitch cone *p* on a generating plane 3. The axis 4 of the gear blank 1 intersects this plane 3 in the cone apex O. The rolling motion is such that the line of contact between the tool 2 and the tooth flank after it has been finished, and when no cut is actually being taken, always lies close to, and, at one point on the roll, lies in the generating plane or surface 3. The gear so formed is an octoid. If a spherical involute profile is to be formed, the base cone of the gear blank 1 is tangential to the plane 3 and the rolling motion is then such that the line of contact between the tool 2 and the finished tooth flank always lies in the plane 3.

The motion of the gear blank 1 has two components, viz. the component of rotation about its axis 4, and the component of bodily angular displacement of the cone axis 4 about the vertical OV drawn through the cone apex O. The component of rotation of the blank 1 about its axis 4 is derived from the rectilinear displacements of two interconnected slides 5, 6 each of which is guided in guideways (to be described later) which are formed on or fixed to a subsidiary framework (also described below) which carries the bearings for the work holder and a transmission system shown at 7. The subsidiary framework, in which the axis 4 is fixed, moves bodily round the vertical axis OV by virtue of the swinging of the slide 5 (as shown at $5_1$) as the latter moves without slipping around the periphery of a base drum 8 regarded as fixed in the machine. This base drum represents the generating plane or surface 3 in the generating roll mechanism.

If the generating surface 3 is a pitch surface of a gear or crown wheel meshing with the blank 1, the ratio of the transmission system 7 will be suitably modified in conjunction with a slight change of angle of the axis 4 relative to the surface 3.

Figure 2:
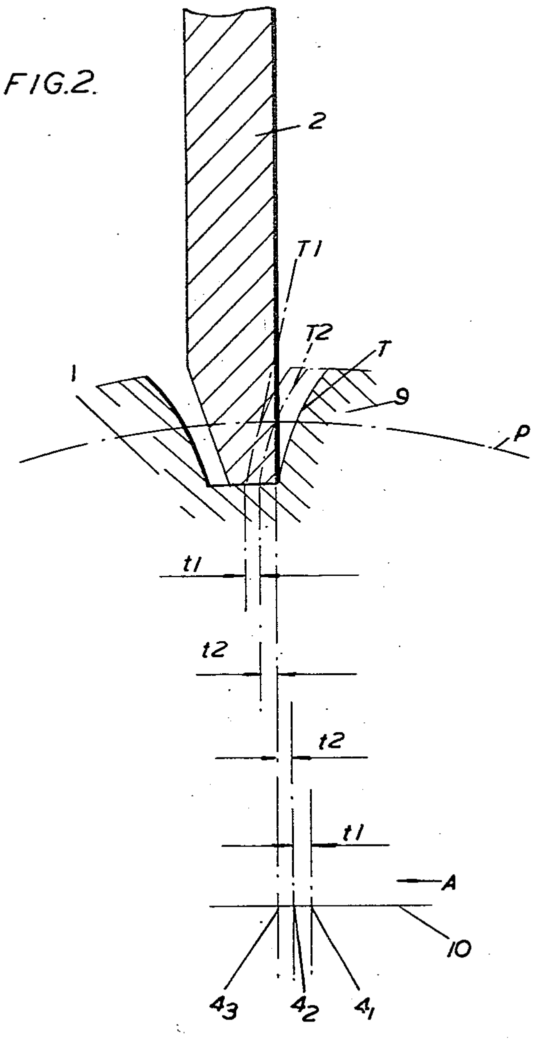

Fig. 2 of the drawings which shows an enlarged section of a tooth 9 and the co-operating tool 2, illustrates successive stages of machining a tooth flank. The final profile is shown in full lines at T, whilst the dotted lines $T_1$ and $T_2$ show two preceding profiles resulting from earlier cuts by the tool 2. The plane of the tool 2 remains fixed in the machine, although it will be understood that the tool 2 is normally traversed in that plane along the length of the tooth 9, i. e. normal to the plane of the figure. When the blank 1 is rolled against the tool 2 to form the profile $T_1$, the axis 4 (regarded as a point $4_1$, $4_2$ or $4_3$ in the figure), is displaced along the line 10 in the direction of the arrow A until it reaches the position shown at $4_1$. If now a cut is taken equal to the distance $t_1$ between the profile $T_1$ and the profile $T_2$ the axis 4 must travel a corresponding further distance $t_1$ along the line 10 to reach the next position $4_2$, and so on until, when the final profile T is machined, the axis reaches the position shown at $4_3$ in its bodily displacement.

It will thus be seen that in machining a tooth flank and taking successive cuts over the whole of its extent, an additional displacement must be imparted to that already executed by the work axis 4 in addition to its normal displacement when the work executes the required generating roll motion. If reference is now made again to Figure 1 of the drawings, it will be seen that the necessary additional displacement of the axis 4 can be effected by imparting an increment of rotation in the direction of the arrow B to the base drum 8. Such an incremental rotation of the drum 8 causes an angular displacement about the vertical OV of the subsidiary frame carrying the generating roll mechanism 5, 6, 7, and the work axis 4. It will be clear that the increment of rotation may be either continuous or intermittent according to requirements, and will be relatively small.

Figure 3 illustrates the manner of applying tip relief to a tooth. In this figure, the dotted line $T_1$ indicates the normal true profile of the tooth flank whilst the full line T illustrates the profile after imparting the tip relief to the tooth. The maximum thickness of metal removed by applying tip relief is shown by the distance *r* between the cutting edge of the tool and the parallel thereto drawn through the tip of the true or unrelieved profile $T_1$. Again in this figure, the axis 4 of Figure 1 is displaced along the line 10 in the direction of the arrow A′ up to the position shown at $4_1$ in forming the true profile $T_1$. In order to produce the profile T, however, the axis 4 must be displaced through an additional distance *r* until it reaches the position indicated at Figure $4_2$ in the drawing.

Again referring to Fig. 1, it will be seen that this additional displacement beyond the normal displacement required for the generating roll motion can be produced by imparting an increment of rotation to the base drum 8 in the direction of the arrow B′. In this case, in distinction to the arrangement shown in Fig. 2, the increment of rotation is applied only at one end of the generating roll of the gear blank 1, the displacement of the axis 4 throughout the remainder of the machining of the tooth flank being unmodified.

Figure 4:
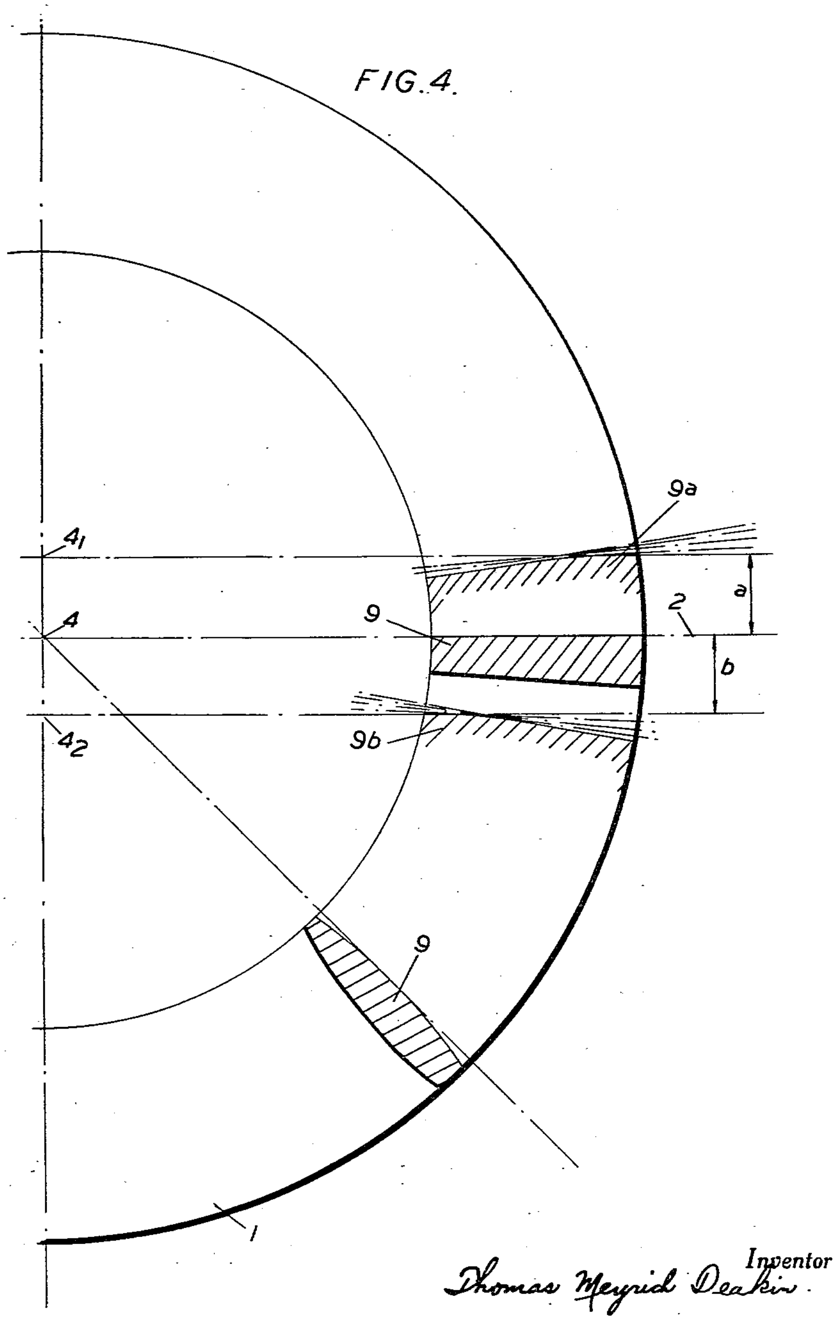
Fig. 4 is a plan view of a bevel gear illustrating the method according to the invention of generating curved tooth flanks.

Fig. 4 illustrates the formation of a longitudinally curved tooth 9 on a gear blank 1. As shown on the right hand half of the figure, the tooth 9 is initially (or may be regarded initially as) a straight-sided tooth the radially inner and outer ends of which are machined away or "backed off" in order to produce the curved profile. The process is illustrated at 9*a* and 9*b* which show, respectively, the machining or "backing off" of the outer and inner ends of the same tooth flank. In order, however, to ensure the maintenance of an accurate tooth profile, the tool (here indicated by the straight line 2 representing its cutting edge) must be displaced in a direction normal to its plane of traverse through distances *a* and *b* respectively. The machining of the ends of the tooth flanks as shown at 9*a*, 9*b* in the figure is, therefore, accomplished by the simultaneous displacement of the axis 4 beyond its normal displacement required by the generating roll motion to positions $4_1$ or $4_2$ respectively, whilst at the same time the tool 2 is given the requisite lateral displacement *a* or *b*. The displacement of the axis 4 is again effected by imparting an increment of rotation to the base drum 8 (see Fig. 1), in either the direction of the arrow B or the arrow B′ as required. The mechanism for effecting this rotation must, however, be suitably ganged to a mechanism for effecting the lateral displacement of the tool in the correct ratio.

Figure 5:
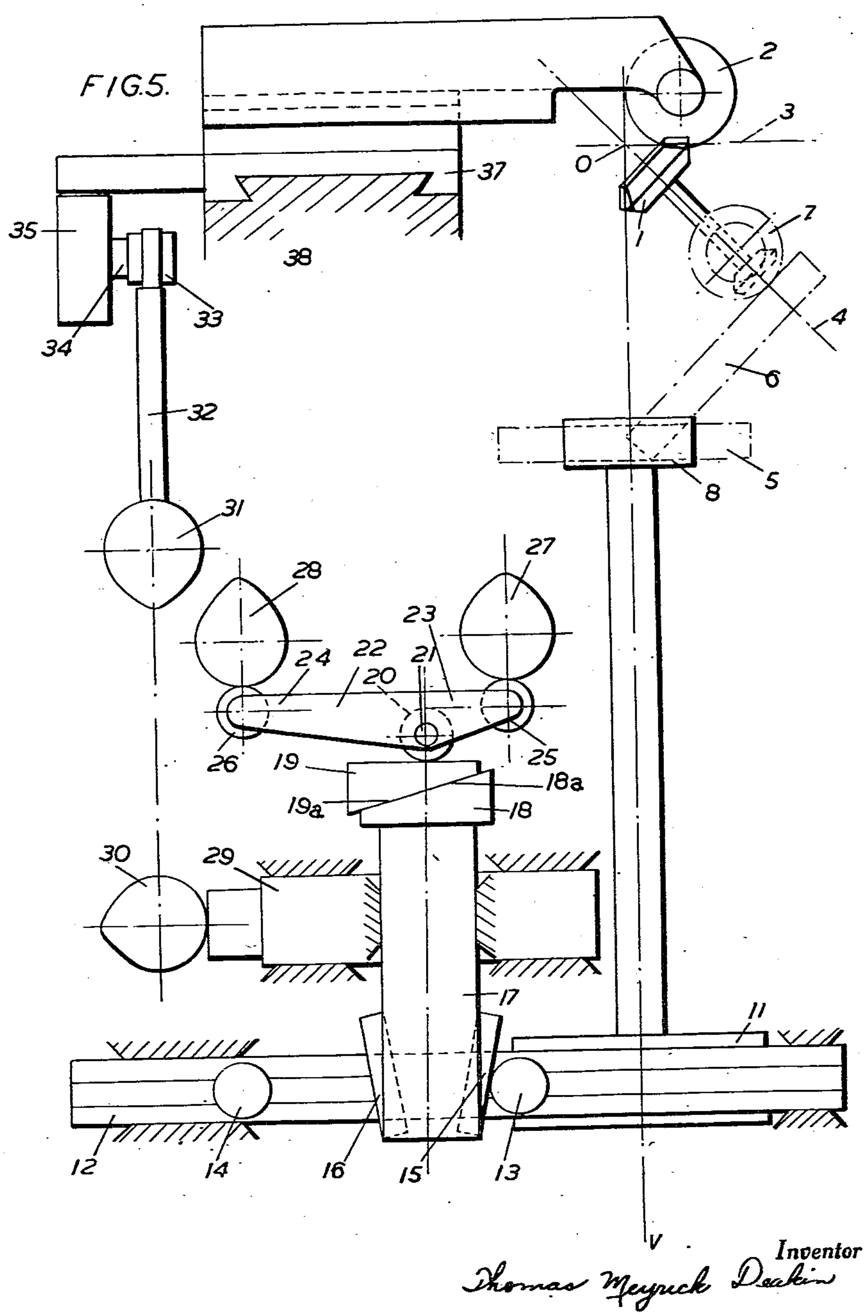
Fig. 5 is a schematic elevation of one layout of mechanism for effecting a feed motion of the gear blank in a generating roll mechanism such as that typified in Fig. 1.
Figure 6:
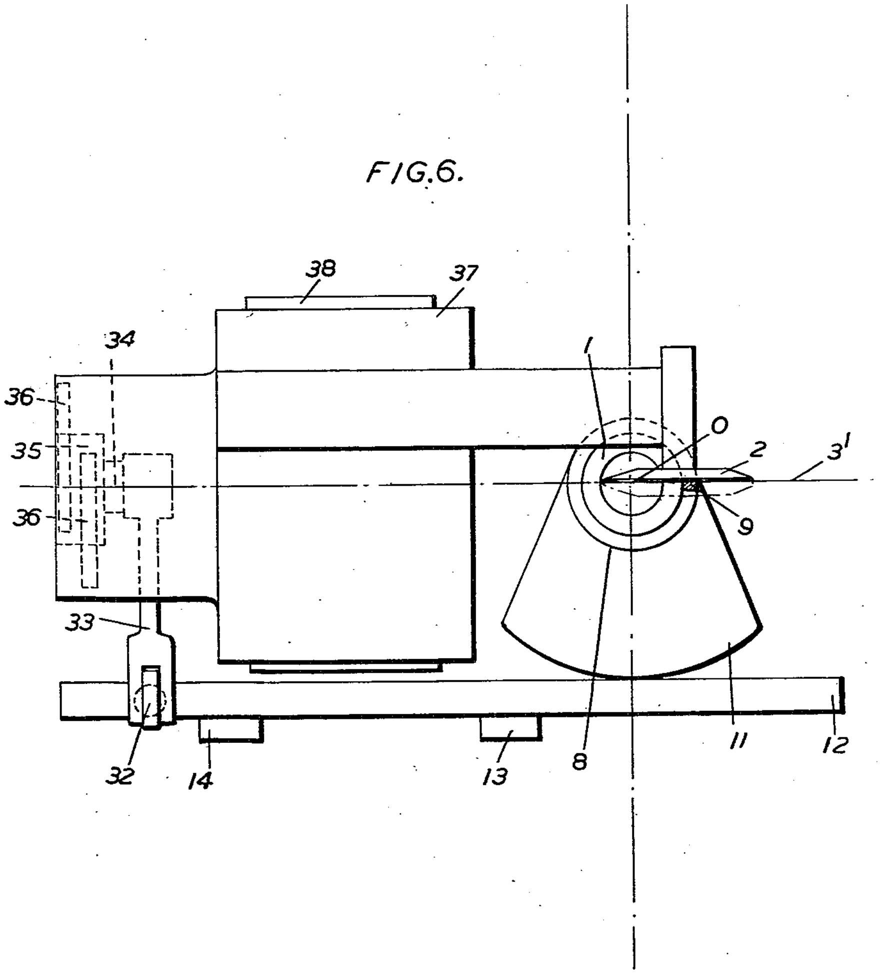
Fig. 6 is a plan view of part of the mechanism shown in Fig. 5.

Figs. 5 and 6 illustrate, in schematic form, a suitable mechanism for effecting the several feed and the tool displacement motions required for carrying out the profile modifications illustrated in Figs. 2 to 4.

In the form of a machine now to be described, the base disc 8 is mounted for limited rotation about its axis in the machine frame. This displacement is controlled by means of a sector 11 which is geared, or coupled by means of oppositely directed taut bands in known fashion, to a rectilinearly reciprocable base drum actuating slide 12 mounted in fixed guides in the machine frame (not shown). The reciprocation of this slide is in turn controlled by the engagement of one of a pair of follower rollers 13, 14 with the inclined control edge of a respective sine bar 15, 16 mounted on a feed control slide 17 which is reciprocable at right angles to the base drum actuating slide 12. The sine bars 15, 16 are set at a relatively small angle to the axis of reciprocation of the feed control slide 17 and may either be permanently fixed or adjustable for angle as preferred. One end of the feed control slide 17 terminates in a taper head 18 set transversely to the slide and having its outer tapering edge 18*a* in contact with a correspondingly tapered edge 19*a* of a tooth thickness adjusting block 19. This block 19 can be moved in the direction of its length relative to the tapered head 18 on the feed control slide 17 and may be adjustably clamped thereto in any desired position. Since the opposite tapers in effect constitute means for adjusting the length of the slide 17 relative to the remainder of the mechanism, and hence provided a fixed increment of rotation of the base drum 8, they are operative to control the tooth thickness of the finished gear.

A roller 20 bears on the opposite edge of the tooth thickness adjusting block 19 and its pivot pin 21 is reciprocable in the same direction as the feed control slide 17, but is not laterally displaceable. The pivot pin 21 also engages a lever 22 having arms 23, 24 of unequal length.

Each arm 23, 24 of the lever 22 terminates in a cam follower formation 25, 26 respectively, which may be constituted by a roller, the formation or roller 25 at the end of the shorter arm 23 of the lever bearing against a feed cam 27. The cam follower formation or roller 26 on the end of the longer arm 24 of the lever 22 bears against a tip or root relief cam 28.

The operation of the mechanism so far described is as follows:

Assuming that the tip and root relief cam 28 remains fixed, rotation of the feed cam 27 forces the lever 22 away from the cam shaft, the lever functioning as though it were pivoted about the cam follower roller 26 bearing against the edge of the tip and root relief cam 28. The roller 20 is thereby displaced in the direction towards the feed control slide 17. The latter is, therefore, in turn displaced by the same amount so that the sine bar 15 displaces the base drum actuating slide 12 through a distance related to the distance of travel of the feed control slide 17 by the sine of the angle to which the sine bar 15 is set. The base drum 8 in the generating roll mechanism is thus given a slight angular displacement which is superimposed on the bodily angular or lateral displacement of the gear blank axis 4 (Fig. 1). The latter is thus moved to a greater extent, this movement being arranged to feed the tooth flank being generated towards the tool 2.

It will thus be seen that by coupling, through appropriate gearing (not shown), the feed cam 27 to the drive for the generating roll mechanism 7 (Fig. 1), a predetermined amount of feed can be imparted to the gear blank 1 during its generating roll motion. The feed cam 27 may be arranged to execute continuous rotation during machining of a particular tooth flank, or it may have increments of rotation imparted thereto at one or both ends of the traverse of the tool 2 along the tooth 9.

In similar manner, it will be understood that the tip and root relief cam 28 will also effect increments of rotation of the base drum 8. This cam, however, is only caused to rotate over a portion of each generating roll of the gear blank 1, and serves to add an additional component of feed motion to that provided by the feed cam 27 when either the tip or the root, or both, of the tooth flank is being machined.

It will further be understood that the zero position of the base drum 8 will be determined, for any given sine bar setting at 15 (or 16), by the zero position of the feed control slide 17 when the feed and tip and root relief cams 27, 28 are in their minimum positions. This zero position is determined by the relative positions of the oppositely tapered head 18 and block 19 on the one end of the feed control slide 17, and means is provided for calibrating these components in terms of tooth thickness.

In order to form longitudinally curved teeth as shown in Fig. 4, the feed control slide 17 is mounted in guides (not illustrated) which are themselves displaceable laterally in a direction parallel to the base drum actuating slide 12. This lateral travel of the feed control slide 17 can take place without detriment to its normal operation of controlling the tooth feed or tip or root relief feed motions by virtue of the provision of the roller 20 on the lever 22, the back edge of the taper block 19 moving with the slide 17 past the roller 20 as the slide is displaced laterally. In the arrangement shown in Fig. 5, the guides for the feed control slide 17 are formed or carried on a curved tooth slide 29 whose position is controlled by a cam 30. This cam is geared to, or mounted on a common shaft with, a tool displacement cam 31, both cams being operated by, or in predetermined relationship to, the generating roll mechanism in such a way that additional travel is imparted to the base drum actuating slide 12 when the ends of the tooth flank are being machined. A cam follower 32 bears on the cam 31 and is pinned to a crank arm 33 whose other end is keyed on the shaft 34 of a drum 35. This drum is connected by oppositely directed taut flexible bands 36 to a slide 37 on which the tool 2 and its driving mechanism (not shown) are carried. The slide 37 is traversible along a fixed guideway 38 in a direction at right angles to the line 3' (see Fig. 6). This line represents the normal direction of traverse of the tool 2 along the length of the tooth 9.

In the mechanism so far described, the slide 12 has been assumed to be in the position shown in Fig. 5 in which the one roller 13 of the pair of rollers 13, 14 is in operative engagement with the corresponding sine bar 15 of the pair of sine bars 15, 16 carried on the feed control slide 17. The feed motion imparted by this arrangement to the work 1 is thus related to a tooth flank on one side only of a tooth 9 (Figs. 2, 3 or 4). When it is desired to machine the opposite flank of a tooth 9, it will be appreciated that the blank 1 must be indexed with respect to the tool 2 through at least a tooth thickness and, since it would normally not be desirable to change the tool for one which moves in the same path but has an oppositely directed cutting edge, the indexing motion would normally be about a half tooth pitch to allow the other tooth flank to be engaged by a second tool. This indexing motion is equivalent to an angular displacement of the axis 4 and can be applied through the same mechanism as that already described above.

Provision is made in this mechanism for performing the necessary indexing operation by moving the base drum actuating slide 12 through the necessary distance, thus causing disengagement of the roller 13 from its co-operating sine bar 15 on the feed control slide 17 and bringing the second roller 14 into engagement with its corresponding sine bar 16. In this way, it will be understood that an exactly similar feed motion will now be superimposed on the normal generating roll motion through the feed control slide 17 as was the case when the roller 13 was operative, but the zero position of the blank 1 has been altered to present the other flank of a tooth 9 to its tool. The mechanism thus eliminates the necessity of re-setting the blank 1 in its work holder between successive machinings of opposite sides of a tooth 9.

It is thought that the operation of the machine with the roller 14 engaged with the sine bar 16 will be sufficiently understood from the foregoing description not to warrant more detailed explanation here. It will, however, be understood that since displacement of the slide 12 effects the angular displacement of the axis 4 of the gear blank 1, a limited amount of indexing motion can be provided by this slide if required. Thus, for example, a double displacement of the slide 12 equivalent to one complete tooth pitch of the gear blank 1 will enable two successive tooth flanks on the corresponding sides of adjacent teeth 9 to be successively machined without the necessity for re-setting the blank 1 in its work holder. Further indexing motion may be provided if desired within the limits of size of the mechanism.

Reference has been made above to arrangements of machines having two tools simultaneously operative on the gear blank. In order that the tools should have the necessary rigidity, it is customary to arrange that they do not engage the blank in the same inter-tooth gap. Such an arrangement, however, is not always satisfactory, and in order to enable the best advantage to be taken of the flexibility of the mechanism according to the present invention in providing a limited indexing action, it is a feature of the invention to mount a pair of tools in such a way that they can be alternatively engaged with the opposite flanks of the same tooth, i. e. they would straddle the tooth, or conversely, they can be alternatively engaged in the same inter-tooth gap for machining the opposed tooth flanks bounding the gap.

Figure 7:
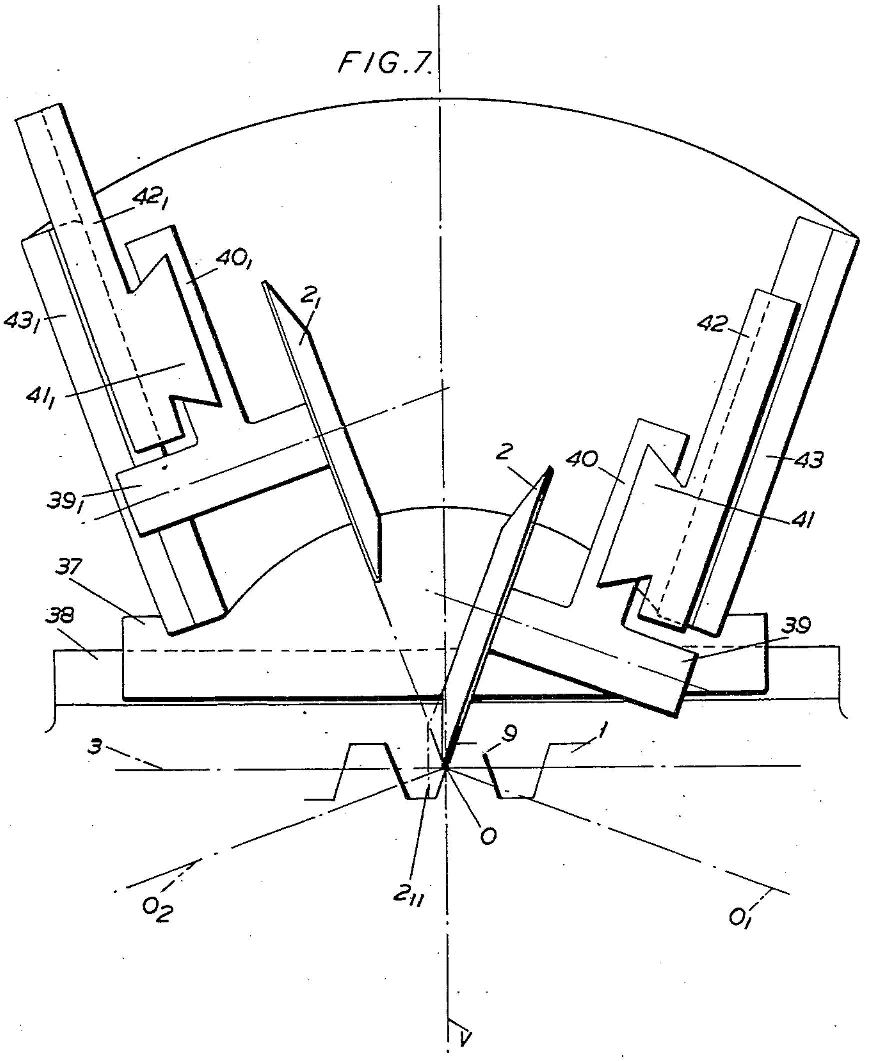
Fig. 7 is a front elevation of a machine according to the invention showing a preferred arrangement of tools.

Figure 7 of the drawings illustrates such an arrangement of tools 2 and 2'. Each tool 2 and 2' is mounted in bearings in a housing 39, 39'. Each housing is mounted on a substantially horizontal slide 40, 40' for effecting the necessary traversing motions of the tool. The slides 40, 40' are themselves supported on substantially horizontal guides 41, 41' which are in turn mounted upon substantially vertical slides 42 and 42' working on guides 43, 43' for effecting the withdrawal motion of the tool from the work.

Both assemblies 39 . . . 43, and 39' . . . 43' are carried on a common slide 37 which can be displaced laterally as shown in Figs. 5 and 6 of the drawings when a longitudinally curved tooth flank is to be machined. The slides 42 and 42' are interconnected in such a way that if tool 2 is in engagement with a tooth flank, the other tool 2' is withdrawn to an inoperative position as illustrated or vice versa. Normally the intersection of the working faces of the tools 2, 2' will be on the generating plane 3. In order to generate a gear on the octoid principle, the guides 43 and 43' will be independently pivoted about respective axes O, O' and O, $O^2$ (which intersect the generating plane 3 at the pressure angle) through an angle such as to give the required dedendum angle of the tooth. The tool 2 will then take up a position 2'' shown in chain dotted lines where it will generate one flank of a tooth 9 on the gear blank 1 (shown as a crown gear). Tool 2' will likewise generate the other flank of the tooth 9.

The mechanism for interchanging the tool 2, 2' is preferably ganged to the mechanism for interchanging the rollers 13, 14 when the gear blank 1 is being indexed, as will be described below.

Figure 8:
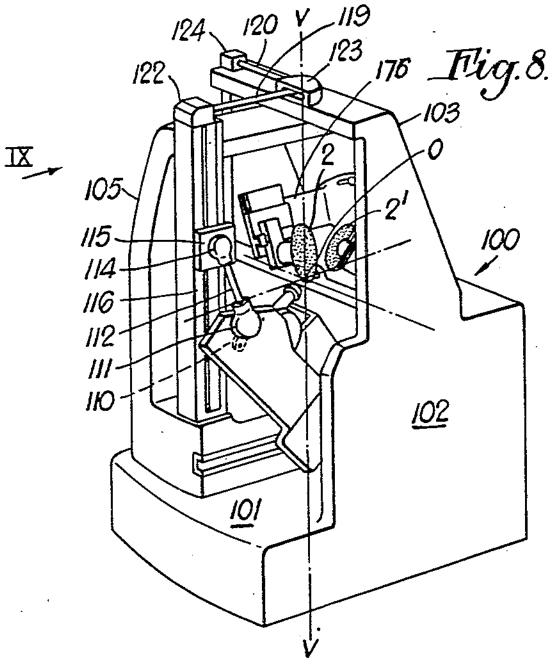
Fig. 8 is a perspective view of a machine embodying the features shown schematically in Figs. 1 to 7.

The machine consists essentially of a somewhat box-like frame 100 (Fig. 8) consisting of a bedplate portion 101 and rigid side frames 102 which support a bridge-like structure 103. An upper bearing 104 (Fig. 11) in the cross-limb of the bridge structure 103 and a lower bearing (not illustrated) in the bedplate 101 are co-axially aligned on the vertical axis OV (see also Figs. 1 and 5) and provide the pivots for a swinging frame 105 on which the work head 106 is adjustably supported on a carriage 107 (Fig. 14) which runs on arcuate guideways 108 struck about the apex O (see also Figs. 1 and 5).

The swinging frame 105 is oscillated about the axis OV by the generating roll mechanism to impart to the work 1 the component of its motion about the axis OV. This is effected by applying a drive to the slide which in turn imparts a reciprocatory motion to the slide 5.

As the slide 5 reciprocates it moves around the base drum 8, as already described, in a horizontal plane to effect swinging of the frame 105 about the axis OV. The slide 6 is coupled by a link 109 (Figure 10) to a crank 110 (see also Figure 14A) which is rotatable through bevel gearing mounted in a casing 111 and driven by a short swinging layshaft 112. This layshaft is in turn driven by bevel gearing 113 (Fig. 10) enclosed in a housing 114 which is mounted on a pick-off saddle 115 slideable on a vertical guideway 116, formed or secured on one side of the swinging frame 105 (see Figs. 8 to 10). Within this guideway 116 is located a vertical shaft 117 having a straight keyway or splines and mounted in bearings at each end of the guideway. A worm 118 is keyed or splined on this shaft 117 and is captive in the saddle 115 to provide a continuous drive to the gearing 113 for the layshaft 112. The shaft 117 is driven through a succession of shafts 119, 120 and 121 coupled by bevel gearings indicated at 122, 123 and 124. The shaft 121 is driven through gearing 125 from the electric motor 126 which also serves to drive the feed and tip relief cams 27 and 28.

The oscillatory motion of the frame 105 about the axis OV is thus positively related to the feed motion and tip relief motion imparted thereto through rotation of the base drum 8, as previously described. The gearing 123 is arranged to maintain constant angular velocity of the shaft 117 during swinging of the frame 105.

Figures 16 and 17 illustrate the manner of controlling the feed and tip relief rotations imparted to the base drum 8. The base slide 5 has a longitudinal channel formation 127 at each end of which are mounted keep plates 128, 129 respectively which co-operate with slide formations 130, 131 (Figure 14) located in a groove 132 formed on the adjacent surface of the swinging frame 105. Between the keep plates 128, 129 there is fixed in the channel 127 a tape block 133 (Figure 16) in which are secured at their one ends two oppositely directed pairs of flexible and inextensible driving tapes 134 and 135 whose other ends are anchored to the base drum 8. The tape block 133 projects through a slot 136 in the central portion of the groove 132 (Figure 14).

The base drum 8 is mounted on a spindle 137 carried in bearings 138 in a tubular housing 139 which is secured by a flange 140 on the bedplate 101. The lower end of the spindle 137 is keyed to the quadrant 11 (see also Figures 5 and 6). Oppositely directed pairs of driving tapes 141, 142 have their one ends anchored to the arcuate edge of the quadrant 11 and their other ends crossed over and anchored to the actuating slide 12 (Figure 17 and see also Figure 6). This slide 12 is reciprocable on a guideway 143 formed or secured on a carrier plate 144 which also carries the feed and tip relief cam drives. A rib 145 is formed on the actuating slide 12 to project into a slot 146 in the carrier 144 between the two parts of the guideway 143 (see Fig. 17). This rib 145 has a longitudinal T-slot 147 machined in the outward-facing edge thereof to receive a pair of adjustable roller blocks 148, 149 which carry the rollers 13, 14 respectively. As previously described with reference to Figure 5, the rollers 13, 14 are adjustably spaced apart the adjustment being determined by means of their respective blocks 148, 149, in the slot 147 of the rib 145 on the slide 12.

The sine bars 15, 16 are mounted in the feed control slide 17 which is located between the outer face of the carrier 144 and the inner face of the curved tooth slide 29. The feed control slide 17 is slotted at 150 to engage a V-guide 151 extending transversely of the curved tooth slide 29 in a central recess 29*a* thereof. The curved tooth slide 29 is reciprocable on V-guides 152 (Figures 11 and 17) on the face of the carrier 144 and has a flat surface 29*b* (Fig. 17) formed on the upper edge thereof and on which are secured the one ends of oppositely directed pairs of driving tapes 153, 154 whose other ends are anchored to a drum 155 rotatable on a spigot 156. The drum 155 carries a crank arm 157 whose free end supports a cam follower roller 158 for engaging the cam 150 (see also Figure 5).

The lever 22 which carries the rollers 25 and 26 engaged by the cams 27, 28 respectively is mounted by a pivot 159 in a bracket 160 which is freely slidable on a short vertical guideway 161 fixed on the front wall 162 of a casing 163 on a carrier 144. The casing 163 encloses the gear train, indicated at 164 in Figures 11 and 17, which interconnects the feed cam 27 and the tip relief cam 28. The gearing 164 has a ratio which is dependent on the relative number of "lifts" on the two cams 27, 28. If the feed cam 27 has one lift, as shown in Figure 17, then the tip relief cam 28, which also has one lift, will be required to make the same number of revolutions as the feed cam, and the gearing ratio will be 1:1. If, however, as shown in Figure 11, the feed cam 27 has three lifts, then the tip relief cam 28 must rotate at three times the speed of the feed cam and the ratio of the gearing will be 1:3.

The casing 163 also encloses the drive from the motor 126 to the gearing 164 and the gearing 125 and also the gearing 166, driven by a lengthwise curvature motor 165, between the two cams 30, 31 (see also Figure 5). Both the cams 30 and 31 are single lift cams and the ratio of the gearing 166 is 1:1.

As already indicated in connection with Figures 5, 6 and 7, the cam 31 controls the lateral displacement of a tool slide 37 so that longitudinal curvature can be imparted to a tooth being machined by displacing the tool out of the plane of its normal reciprocation during its cutting stroke. As shown in Figures 9, 10 and 11, the slide 37 is of two-part construction. The tapes 36 which wrap around the drum 35 are anchored to a lower slide part 167 on which is mounted an upper slide part 168 adjustable along a V-guide 169 under the control of a screw 170. This screw serves to vary, in the direction of lateral displacement of the tool, the relative positions of the slide parts 167, 168 so that the tool may be given a permanent offset if desired, for example, as shown at *d* in Fig. 19 when machining a skew gear. The screw 170 also serves to adjust the tool with respect to the cone apex O, as, for example, when a worn tool is replaced by a new one.

The slide 168 extends across the rear of the machine as shown in Figures 10 and 11, and is shaped as shown in Fig. 18. It consists of a flat table-like surface 168*a* with a semi-circular upstanding rear flange 168*b*. A boss 171 is formed on the forward edge of the horizontal table 168*a* and is bored at 172 to receive a pivot pin 173 (not shown in Figure 18) which passes through a co-axial hole 174 in the semi-circular flange 168*b*. Between the boss 171 and the semi-circular flange 168*b*, the pivot pin 173 carries a pair of pressure angle adjusting brackets 175, 176, the former being indicated by the dotted lines as broken away in Figure 18. The bracket 175 has a pair of lugs 177 which are inter-fitted on the pivot pin 173 with a corresponding pair of lugs 178 on the bracket 176. The brackets have arcuate slots 179 formed in the rear walls thereof (see Figures 9 to 18) through which project clamping studs or bolts 180 which are threaded into the semi-circular flange 168*b*. These clamping bolts permit limited angular adjustment of the brackets 175, 176 to vary the angle between the plane of traverse of the tool along the tooth flank and the vertical plane containing the axis 4 of the work. This adjustment is made in dependence on the required pressure angle of the tooth of the gear 1 being machined.

Each bracket 175, 176 has a forward projecting horn 181 in which is machined an arcuate guideway 182 struck about the axis $OO_1$ or $OO_2$, respectively, of Fig. 7. In this guideway 182 works a back-plate 183 on which is formed the guide 43, 43′ of Figure 7. The arcuate guideway 182 permits the tool to be adjusted so that it will machine the dedendum portion of the tooth flank. This setting is shown in exaggerated proportion in Figure 13.

The drawings show a pair of tools represented by grinding wheels 2, 2′ which can be alternatively engaged with the work 1. This alternative engagement is controlled by hydraulic or like tool retracting servomotors 184, 185 connected between the back plate 183 and the respective vertical withdrawal slide 42, 42′ of the two tool assemblies. These servomotors are controlled by a master cylinder 186 mounted on the carrier 144 (see Figures 9 and 11) and having its piston rod 187 connected to a lug 188 on the base slide 12 of the machine.

The arrangement operates as follows: When the base slide 12 is moved lengthwise to disengage one of the two rollers 13, 14 from its associated sine bar 15, 16 and to engage the other of the rollers, the piston of the master cylinder 186 is displaced correspondingly and forces oil around a circuit which includes the two servomotors 184, 185. These motors are arranged to operate in opposite directions so that one feeds the associated tool (say, the tool 2) into the work 1, whilst the other retracts its associated tool (say, 2′) from engagement with the work. The arrangement ensures that the correct tool is presented to the work for a given setting of the base slide 12.

Traverse of the tools 2, 2′ is effected by means of a motor 189 mounted on the withdrawal slide 42 or 42′ and coupled to the traverse slide 40 or 40′ by means of a crank 190 and link 191 the other end of which is pinned at 192 to the traverse slide. The tools 2, 2′ are shown as grinding wheels which are mounted in cylindrical quills 193 secured in brackets 194 on the traverse slides 40, 40′. The wheels 2, 2′ are rotated by a series of belts 195, 196, 197 driven by motors 198. The belt 195 passes round a pulley 199 on the tool shaft and one half of a double pulley 200 supported on a spindle 201 which is carried in a pair of forks 202, 203. The fork 202 is formed on the upper end of a link 204, the lower end of which is journalled on the tool spindle adjacent the pulley 199. The fork 203 is formed on the outer end of a link 205 whose inner end is also formed as a fork 206 which embraces a second double pulley 207. The spindle 208 of this pulley is held in a bracket 209 fixed on the horn 181 of the respective pressure angle adjusting bracket 175, 176. The belt 196 runs between the other half of the double pulley 200 and the corresponding half of the second double pulley 207. The links 204 and 205 are arranged so that tension of the belts 195, 196 is maintained at the same value throughout the traverse or retraction movements of the respective tool 2, 2′. The motors 198 are mounted on the upper part 168*a* of the two-part slide 37, preferably behind the rear semi-circular flange 168*b*, this flange being appertured as required to permit the passage of the belt 197 therethrough. In Fig. 9, the belts 195, 196 and 197 and the various pulleys and links associated with the retracted tool 2′ are enclosed in a cover 210.

Although the tool retracting servomotors 184, 185 have been described as hydraulic motors controlled by a hydraulic master cylinder 186, it will be understood that they may be replaced by an equivalent electrical or mechanical control gear. Furthermore, the drive from the feed control motor 126 to the slide 6 may be transmitted wholly or in part through an electrical or hydraulic servo link, it being understood that the correlation between angular displacement of the swinging frame 105 about the axis OV and the angular feed displacement of the base drum 8 about the same axis must be held within close limits throughout the generating roll if an accurate profile is to be generated on the tooth 9.

Although the pressure angle adjusting brackets 175, 176 have been described and illustrated as independently movable, it will be understood that they may be interconnected by a linkage or gearing in such a way that adjustment of one bracket results in a corresponding complementary movement of the other bracket, thereby automatically preserving the angular relationship between the tools 2, 2′ and the vertical plane containing the cone apex O and the mean path of traverse of a tool across the work 1.

Although throughout the preceding description the tool 2 and 2′ has been shown as a grinding wheel or a milling cutter, it will be understood that the invention is applicable to machines using single-edge planing tools or even broach tools.

The necessary motions for effecting feed of the work may be in the form of any mechanical equivalent of a cam and follower—for example, a reversible feed screw or the like. Thus for example the lever 22 and the cams 27 and 28 may be replaced by a feed screw representing the cam 27 which is rotatable in a captive nut which itself can be rotated to represent the motion produced by the tip or root relief cam 28. The slide 29 and cam 30 can also be replaced by a feed screw or equivalent mechanism as will be understood.

What I claim is:

1. In a bevel gear generating machine in which a workpiece is rolled on an imaginary generating plane against a tool, a main frame; a tool head carried by the main frame; a sub-frame journalled on the main frame about a fixed axis normal to the generating plane; a work holder on the sub-frame; a base drum supported in the main frame for small increments of rotation about a fixed axis; a non-slip roll-generating coupling between the base drum and the work holder and carried by the sub-frame; a drive for oscillating the sub-frame about the said axis to produce a generating roll of the work relative to the tool; and a separate coupling between the oscillatory sub-frame drive and the base drum for imparting to the latter increments of rotation at appropriate periods in the generating roll action in accordance with the desired tooth profile modifications.

2. In a bevel gear generating machine in which a workpiece is rolled on an imaginary generating plane against a tool, a main frame; a sub-frame journalled in the main frame about a fixed axis normal to the generating plane; a tool; a tool head carried in the main frame; a work holder mounted in the sub-frame for supporting the work in gear generating engagement with the tool; a base drum mounted in the main frame coaxially with the said fixed axis; a first slide supported for rectilinear displacement in the sub-frame; a non-slip connection between the first slide and the cylindrical surface of the base drum; a second slide supported for rectilinear displacement in the sub-frame at an angle to the first slide equal to the angle between the work axis and the said fixed axis; a mechanical driving coupling between the first and second slides; a work shaft in the work holder; means for adjusting both the angle of the axis of the work shaft relative to the said fixed axis and the angle of the second slide relative to the first slide in dependence on the cone angle of the work; drive mechanism for swinging the sub-frame about the fixed axis to produce a generating roll motion of the work relative to the tool; and means coupled to said drive mechanism for imparting a predetermined degree of rotation to the base drum during the generating roll in order to effect a desired modification of the presentation to the tool of a tooth flank of the work.

3. In a bevel gear generating machine in which a workpiece is rolled on an imaginary generating plane against a tool, a main frame; a sub-frame journalled in the main frame about a fixed axis normal to the generating plane; a drive mechanism for swinging the sub-frame about the said axis to produce a generating roll; a tool; a tool head carried in the main frame; a work holder mounted in the sub-frame for supporting the work in gear generating engagement with the tool; a work shaft journalled in the work holder; a base drum mounted for predetermined rotation in the main frame coaxially with the fixed axis; a rigid non-slip driving connection between the base drum and the work shaft and carried on the sub-frame; a drum actuating slide reciprocable in the main frame; a driving connection between the actuating slide and the base drum; a feed control slide reciprocable in the main frame transversely of the actuating slide; a control surface on the feed control slide extending obliquely to the direction of reciprocation thereof; and a positive driving connection between the oblique control surface and the actuating slide for effecting linear displacement of the latter proportional to linear displacement of the feed control slide during a generating roll in dependence on the desired modification of a tooth flank of the work.

4. A bevel gear generating machine as claimed in claim 3 including a tooth profile relief element in engagement with the feed control slide and means for moving the said profile relief element at the appropriate instant during a generating roll of the work relative to the tool so as to impart to the feed control slide an additional component of displacement proportional to the desired tooth profile relief.

5. A bevel gear generating machine as claimed in claim 4 including a driving motor, a driving connection from the motor to the sub-frame; and a driving connection from the motor to the profile relief element.

6. In a bevel gear generating machine in which a workpiece is rolled on an imaginary generating plane against a tool, a main frame; a sub-frame journalled in the main frame about a fixed axis normal to the generating plane; a drive mechanism for swinging the sub-frame about the said axis to produce a generating roll; a tool; a tool head carried in the main frame; a work holder mounted in a sub-frame for supporting the work in gear generating engagement with the tool; a work shaft journalled in the work holder; a base drum mounted for predetermined rotation in the main frame coaxially with the fixed axis; a rigid non-slip driving connection between the base drum and the work shaft and carried on the sub-frame; a drum actuating slide reciprocable in the main frame; a driving connection between the actuating slide and the base drum; a feed control slide reciprocable in the main frame transversely of the actuating slide; a control surface on the feed control slide extending obliquely to the direction of reciprocation thereof; a positive driving connection between the oblique control surface and the actuating slide for effecting linear displacement of the actuating slide; a pivot slide reciprocable on the main frame structure collinearly with the feed control slide; an operating lever pivotally mounted intermediate its ends on the said pivot slide and engaged with the feed control slide; a feed cam engageable with one end of the said operating lever and journalled in the main frame structure; a tip relief cam engageable with the other end of the said operating lever and journalled in the main frame structure; driving connections between each of said cams and the mechanism for swinging the sub-frame; and means for setting each cam relative to the sub-frame swinging mechanism to render the cam operative for effecting displacement of the feed control slide at the appropriate part of the generating roll cycle of the work.

7. A bevel gear generating machine as claimed in claim 6 having interposed between the feed control slide and the operating lever a feed control slide zero-setting device comprising a pair of blocks each having an edge located at right angles to the axis of the slide and engageable respectively with the slide and the lever and an edge inclined thereto which is slidably engageable with the corresponding edge on the other block, and means for adjusting the position of one block relative to the other in the direction of length of its inclined edge.

8. In a bevel gear generating machine in which a workpiece is rolled on an imaginary generating plane against a tool, a main frame; a sub-frame journalled in the main frame about a fixed axis normal to the generating plane; a work holder on the sub-frame; a base drum supported in the main frame for incremental rotation about the fixed axis; a non-slip coupling between the base drum and the work holder and carried by the sub-frame; a drive for oscillating the sub-frame about the said fixed axis to produce the required generating roll motion; a separate coupling between the sub-frame drive and the base drum for synchronising incremental rotation of the said drum with the generating roll; a subsidiary drive compounded with said separate coupling for superimposing an angular displacement on the said incremental rotation; a tool head carrying a tool and mounted on the main frame so as to be laterally displaceable thereon parallel to the generating plane and in a direction substantially normal to the tooth flank profile of the work; and an operative connection between said laterally displaceable tool head and said subsidiary base drum drive to offset the tool head so that the path of traverse of the tool past the work is displaced parallel to itself through the requisite distance for imparting a curvature to the end portions of the tooth flank profile seen in plan.

9. A bevel gear generating machine as claimed in claim 8 wherein the laterally displaceable tool head comprises a transversely slidable table, and the operative connection between the table and the subsidiary base drum drive is adjustable to accommodate different types of teeth.

10. In a bevel gear generating machine in which a workpiece is rolled on an imaginary generating plane against a tool, a main frame; a sub-frame journalled in the main frame about a fixed axis normal to the generating plane; a work holder on the sub-frame; a base drum supported in the main frame for incremental rotation about the said axis; a non-slip coupling between the base drum and the work holder and carried by the sub-frame; a drive for oscillating the sub-frame about the said fixed axis to produce the required generating roll motion; a separate coupling between the sub-frame drive and the base drum for synchronising incremental rotation of the said drum with the generating roll, said coupling including a drum actuating slide reciprocable in the main frame; a driving connection between the said actuating slide and the base drum; a feed control slide reciprocable transversely of the actuating slide; an oblique control surface on the feed control slide; means on the actuating slide for engagement by the control surface to effect linear displacement of the actuating slide proportional to the reciprocatory travel of the feed control slide; a saddle mounted on the main frame adjacent the actuating slide for linear sliding motion parallel to said actuating slide; a transverse guideway in said saddle for slidably receiving said feed control slide; a subsidiary base drum drive coupled to said saddle for linearly displacing said saddle and with it said feed control slide; a tool head carrying a tool and mounted on the main frame so as to be laterally displaceable thereon parallel to the generating plane and in a direction substantially normal to the tooth flank profile of the work; and an operative connection between said laterally displaceable tool head and said subsidiary base drum drive to offset the tool head so that the path of traverse of the tool past the work is displaced parallel to itself through the requisite distance for imparting a curavture to at least the end portion of the tooth flank as seen in plan.

11. A bevel gear generating machine as claimed in claim 10 including a pivot slide reciprocable on the main frame structure in the same direction as the feed control slide; an operating lever pivotally mounted intermediate its ends on the said pivot slide and slidably engaged with said feed control slide for permitting relative motion in a direction transverse to the direction of reciprocation of the feed control slide; a feed cam engageable with the one end of said operating lever and journalled in the main frame structure; a tip relief cam engageable with the other end of the said operating lever and journalled in the main frame structure; driving connections between each of said cams and the mechanism for swinging the sub-frame; and means for setting each cam relative to the sub-frame swinging mechanism to render the cam operative for effecting displacement of the feed control slide at the appropriate part of the generating roll cycle of the work.

12. In a bevel gear generating machine as claimed in claim 3, the provision on the feed control slide of a pair of equally and oppositely inclined oblique control surfaces, alternative positive drive connections on the actuating slide each engageable with a respective control surface, and means for displacing the actuating slide to bring either positive connection into engagement with its respective control surface at will.

13. A bevel gear generating machine as claimed in claim 1 including a tool head mounted for displacement of the tool laterally in the direction of the additional component of displacement of the work axis due to the incremental rotation of the base drum, and an operative connection between the tool head and means for imparting the said incremental rotation to the base drum for the purpose of synchronising the lateral displacement of the tool with the said additional component of displacement of the work axis.

14. A bevel gear generating machine in which a workpiece is rolled on an imaginary generating plane against a tool, having a main frame supporting a tool head; a pair of alternatively operable tools mounted in said head; a work holder for presenting a workpiece to the operative tool during a generating roll of the machine; a sub-frame carrying the work holder and pivotally mounted in the main frame on a fixed axis normal to the generating plane of the machine, a base drum supported in the main frame for predetermined small rotational displacements about said axis; a generating roll mechanism coupling the work holder to the base drum and comprising a first slide engageable in non-slip relation with the arcuate surface of the said drum and a second slide angularly adjustable with respect to the first slide and having a positive driving connection therewith; a drum actuating slide reciprocably guided in the main frame and coupled in non-slip relation to the base drum; a control slide having opposed inclined control surfaces; guideways on the main frame for supporting said control slide at right angles to said actuating slide; means for displacing said actuating slide into driving engagement with either of said control surface at will, and a connection between said actuating slide and the tool head for bringing the appropriate tool into engagement with work in dependence on whichever control surface is engaged by the actuating slide.

15. A bevel gear generating machine having a main frame; a tool head located on the main frame; a pair of alternatively operable tools mounted in said head; a sub-frame pivotally mounted in the main frame about a fixed axis normal to the generating plane; a base drum mounted in the main frame coaxially with the said fixed axis; a work holder supported on the sub-frame for presenting a workpiece to the operative tool in gear generating relation; generating roll mechanism connecting the base drum and the work holder for controlling the path of the tool relatively to the tooth flank being machined in accordance with the geometrical construction of the desired tooth flank profile; a drive to the sub-frame for effecting oscillations thereof about a fixed axis; a coupling between said drive and the base drum for imparting increments of rotation thereto during a generating roll of the work in dependence on a desired modification of the said profile; and means for bringing a selected one of the said tools into its operative position in a direction transverse to its direction of traverse relative to the work during a working stroke.

16. A bevel gear generating machine in which a workpiece is rolled on an imaginary generating plane against a tool, having a main frame; a tool head on the frame; a pair of alternatively operable tools mounted in said head; a sub-frame mounted in the main frame for oscillation about a fixed axis normal to the generating plane; a work holder adjustably carried on the sub-frame for presenting the work to the operative tool; a generating roll mechanism connecting the tool head and the work holder for controlling the path of the tool relative to the tooth flank being machined in accordance with the geometrical construction of the desired tooth flank profile, said mechanism including a base drum supported on the main frame for limited controlled angular displacement about the fixed axis, and slide means carried on the sub-frame for interconnecting said drum and said work holder in non-slip manner during oscillation of the sub-frame; and means for bringing a selected one of the said tools into its operative position in a direction transverse to its direction of traverse relative to the work during a working stroke comprising a separate carriage for each tool; a slide for each carriage; a common supporting structure having guideways to receive each slide for reciprocation in a direction towards and away from the work at an angle to the direction of traverse of the operative tool relative to the work during a generating roll, said guideways lying in planes which each make an angle with the normal to the generating plane equal to the pressure angle of the tooth; and an operative connection between the said slides for ensuring displacement thereof in opposite directions whereby only one tool is presented to the work at a time.

17. A bevel gear generating machine in which a workpiece is rolled on an imaginary generating plane against a tool, comprising a main frame; a sub-frame journalled therein for oscillation about a fixed axis normal to the generating plane; a work holder on the sub-frame; a base drum mounted in the main frame for controlled increments of angular displacement about the said fixed axis;

a generating roll mechanism interconnecting the base drum and the work holder; drive mechanism for effecting oscillation of the sub-frame; an operative connection between said drive mechanism and said base drum for effecting said controlled increments of angular displacement of the base drum in synchronism with the sub-frame oscillations; a tool head in the main frame comprising a tool supporting structure; a pair of tools for alternative operative engagement with the work; a carriage for each tool mounted on the said supporting structure for reciprocation, each in anti-phase with the other, towards and away from the work holder in directions making equal and opposite angles with the normal to the generating plane of the same magnitude as the pressure angle of the tooth flank profile being generated; brackets supporting the respective tool carriages; a common pivot for the two brackets which is fixed in the said common tool-supporting structure to lie in the generating plane and contain the cone apex of the work; and means for adjusting each bracket about said pivot.

18. A bevel gear generating machine as claimed in claim 17 wherein each tool carriage is supported on its respective bracket by an arcuate slide struck about an axis normal to the plane of traverse of the associated tool when machining the work and containing the cone apex of the work, whereby the tool carriage may be set to cause the tool to traverse the dedendum of the tooth flank profile.

References Cited in the file of this patent

UNITED STATES PATENTS

| | | |
|---|---|---|
| 1,135,780 | Drummond et al. | Apr. 13, 1915 |
| 2,207,018 | Linse et al. | July 9, 1940 |
| 2,221,827 | Wildhaber | Nov. 19, 1940 |
| 2,319,117 | Drummond | May 11, 1943 |
| 2,401,810 | Aeppli | June 11, 1946 |
| 2,404,573 | Graf | July 23, 1946 |
| 2,442,734 | Suire | June 1, 1948 |
| 2,486,020 | Graf | Oct. 25, 1949 |
| 2,567,460 | Aeppli | Sept. 11, 1951 |

FOREIGN PATENTS

| | | |
|---|---|---|
| 183,010 | Switzerland | Mar. 15, 1936 |